Dec. 11, 1923.  
E. V. HILL  
COIN SELECTOR  
Filed Nov. 9, 1918

E. V. HILL 1,477,221

COIN SELECTOR

Filed Nov. 9, 1918

Inventor
E. V. Hill
By Attorney
Geo. W. Kennedy

Dec. 11, 1923.                                              1,477,221
                          E. V. HILL
                        COIN SELECTOR
                     Filed Nov. 9, 1918        8 Sheets-Sheet 5

Dec. 11, 1923.

E. V. HILL

COIN SELECTOR

Filed Nov. 9, 1918

E. V. HILL 1,477,221

COIN SELECTOR

Filed Nov. 9, 1918

Inventor
E. V. Hill
By Attorney
Geo. H. Kennedy Jr.

Patented Dec. 11, 1923.

1,477,221

UNITED STATES PATENT OFFICE.

ERNST V. HILL, OF WORCESTER, MASSACHUSETTS, ASSIGNOR, BY MESNE ASSIGNMENTS, TO E. A. W. JEFFERIES, WILLARD A. WINN, NILS BJORK, M. CLIFTON NELSON, AND WILLIAM J. DENHOLM, TRUSTEES, ALL OF WORCESTER, MASSACHUSETTS.

COIN SELECTOR.

Application filed November 9, 1918. Serial No. 261,797.

*To all whom it may concern:*

Be it known that I, ERNST V. HILL, a subject of the King of Sweden, residing at Worcester, in the county of Worcester and Commonwealth of Massachusetts, have invented a new and useful Improvement in a Coin Selector, of which the following, together with the accompanying drawings, is a specification.

The present invention relates to devices for separating standard coins of a predetermined denomination from counterfeits, slugs, washers, and other spurious disk-like bodies of generally similar dimensions; such devices are ordinarily known as coin selectors or detectors, and the object of the present invention is to increase the efficiency of the type of coin selector or detector which is shown and described in United States Letters Patent No. 1,236,870, patented August 14, 1917, by George C. Reith.

The detector of the above recited Reith patent is designed to receive and accept standard coins of two different sets of dimensions, but of the same denomination, such for instance as the "buffalo" and "V" nickels of United States coinage; and at the same time to reject and refuse any other coin, slug, washer, or counterfeit of either of the two kinds of coin that it will pass. The present invention contemplates the provision of additional and more accurate coin measuring instrumentalities, movements and controls in a detector of the type disclosed in the Reith patent, to the end that the efficiency of the detector as a rejector of spurious coins or tokens may be increased. The invention is fully set forth in the following description and pointed out particularly in the annexed claims, reference being had to the accompanying drawings, in which

Like reference characters refer to like parts in the different figures.

In the present invention, certain of the features of the detector shown and described in the aforesaid patent to Reith are retained in their entirety, and for convenience of illustration these features are here shown of substantially the same form and configuration as in said Reith patent, although it is to be understood that the present invention is susceptible of wide variations and deviation from Reith in respect to these parts. For example, as in Reith, the detector mechanism is carried in an elongated casing 1, whose upper portion is semi-cylindrical in section and whose lower portion is substantially rectangular in section. This casing 1, as in the Reith patent, is here shown as detachably mounted on a standard 2 which is formed integral with a base piece 3 in the form of a shallow receptacle. The latter has a transverse vertical partition 4 with a central upwardly projecting extension 5, which is designed to cooperate with a swinging valve 6 to direct a coin passing through said valve into one or the other of a pair of compartments 7 and 8, separated by the partition 4.

As in the detector of Reith, the disposition of this valve 6 at one side or the other of the extension 5 is availed of to direct genuine coins into one compartment 8, and the spurious coins, slugs, counterfeits and the like, into the other compartment 7. The position assumed by the valve 6 is controlled by certain coin measuring instrumentalities, hereinafter described in detail, which are contained within and supported by a pair of cylindrical barrels 9 and 10, the first being rigidly fixed in that end of the casing 1 most distant from the standard 2, while the other is slidably movable within the front or opposite end of the casing 1. Said front end of the casing 1 is closed by a block 11, which provides bearings 13 for a horizontal operating shaft 12, having any suitable means for its actuation, such as a crank arm 14.

The shaft 12 carries a cam 15, and the latter in addition to its function as a cam, hereinafter described, is slotted at 16 to receive the end of a link 17 having a pivotal connection 18 therewith. The opposite end of link 17 is pivotally connected at 19 with a flanged sleeve 20 mounted for reciprocating movement in the block 11 and adapted to be actuated by rotation of shaft 12 through the link 17. The rear end of sleeve 20 has a flange that fits loosely within an undercut recess of a disk or plate 21, the latter being of the same diameter as the barrel 10, and freely slidable in the casing 1 between said barrel 10 and the block 11. The block 11 is held stationary in the casing 1 by a transverse bolt 22, the removal of which allows the barrel 10 and plate 21 to be withdrawn from the casing 1.

Figures 3, 6:
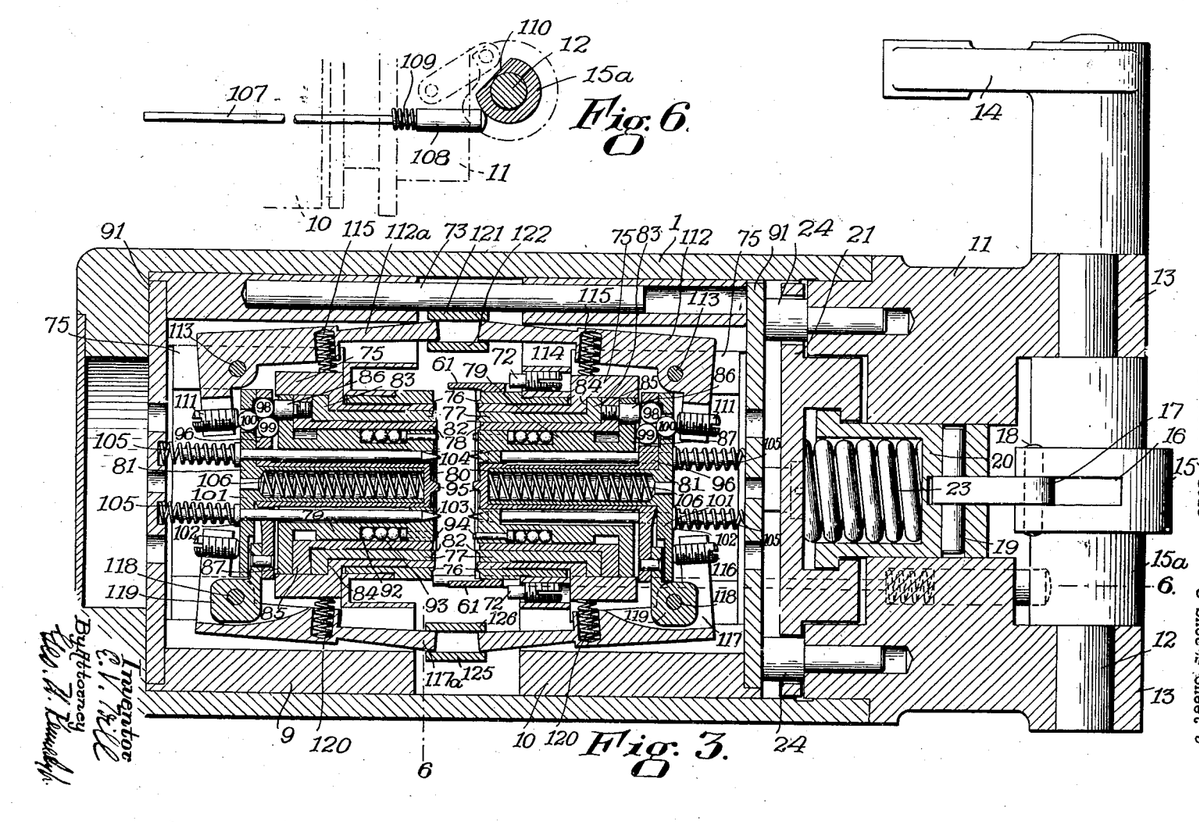
Figure 3 is an enlarged horizontal section on line 3—3, Fig. 2.
Figure 6 is a fragmentary vertical section on the line 6—6, Fig. 3.
Figure 4:
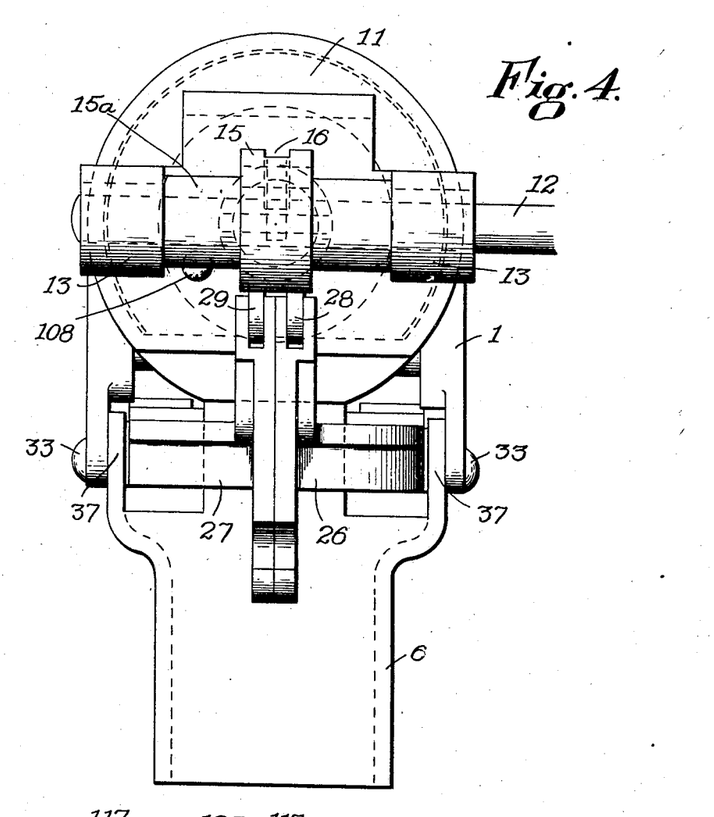
Figure 4 is an end view of the detector mechanism.

Within the sleeve 20 is disposed a relatively powerful spring 23, which bears against the adjacent face of plate 21 and normally holds the latter at the limit of its separation from said sleeve, as shown in Fig. 3. The barrel 10 is maintained at a predetermined minimum distance from the block 11 by means of pins 24, which are fixed at the rear of the block 11, and pass loosely through openings in the plate 21. The spring 23 is capable of yielding to allow of relative movement between the sleeve 20 and plate 21 when a slug or piece of greater thickness than a standard coin is presented between the barrels 9 and 10, so as to prevent damage to the machine, when the barrel 10 is moved against said slug or piece, as hereinafter described.

Figure 14:
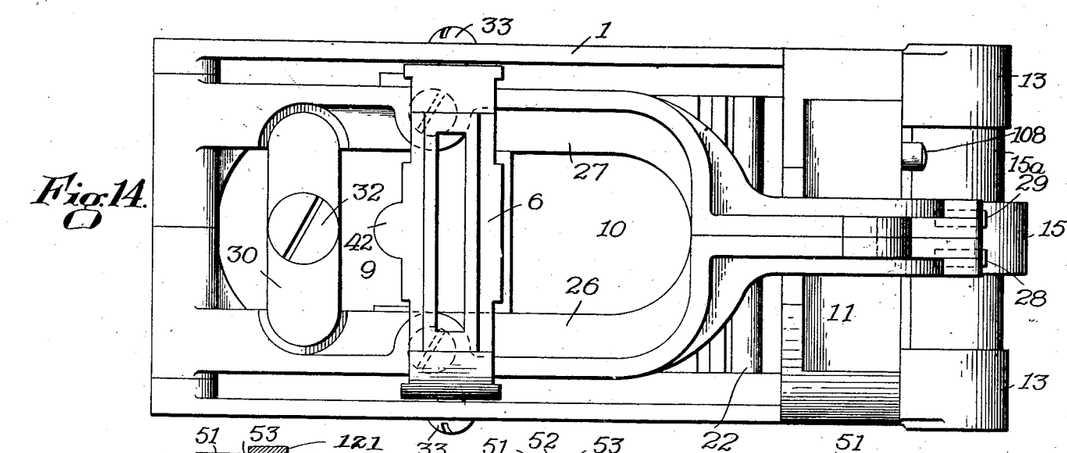
Figure 14 is an inverted plan view of the coin detector.

A horizontal spindle 25 extending transversely of the casing 1 at the bottom rear part thereof forms a pivot for a pair of levers 26 and 27, which serve for the operation of the coin directing valve 6. Said levers 26 and 27 extend longitudinally within the lower part of the casing 1, as shown in Fig. 14, and at their free ends are brought into juxtaposition beneath the cam 15 on shaft 12, where they are provided respectively with rollers 28 and 29 operative on the face of said cam. A cross bar 30 fitted into recesses on the under side of said levers is operated upon by a spring 31 surrounding a bolt 32 which depends from the stationary barrel 9. The action of this spring, through the cross bar 30, strongly presses the two levers 26 and 27 against the cam 15.

Figures 9, 10, 11, 12, 13:
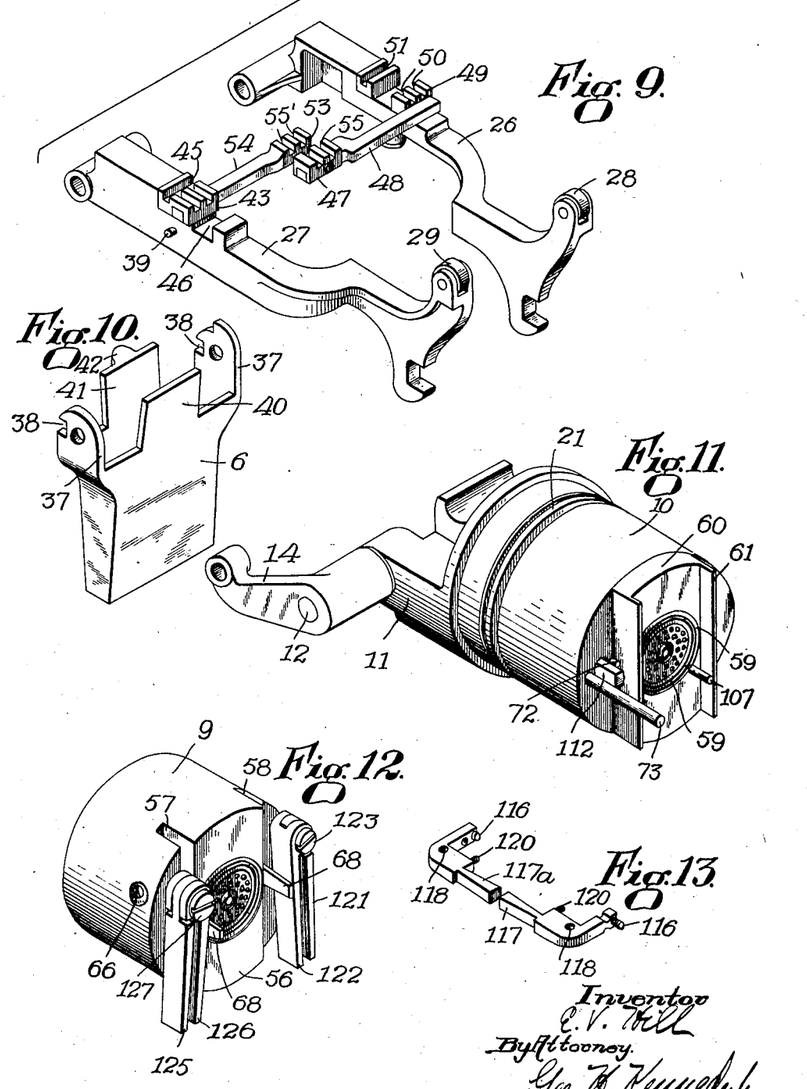
Figure 9 is a detached perspective view of a pair of valve operating levers.
Figure 10 is a perspective view of a coin directing valve.
Figures 11 and 12 are perspective views of a pair of cooperating barrels carried by the main casing of the detector.
Figure 13 is a detached perspective view of a pair of operating levers.
Figure 15:
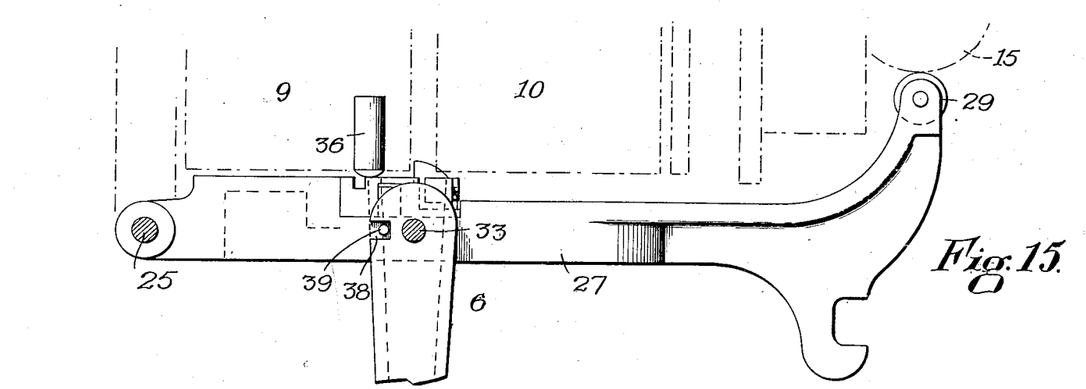
Figure 15 is a side elevation partly in section illustrating the relation of the coin directing valve of Fig. 10 to the operating levers of Fig. 9.

The coin directing valve 6 which is operated by the two levers 26 and 27, is pivotally suspended from trunnion screws 33, Fig. 15, carried by the sides of the casing 1, and projecting into suitable apertures in the opposite side arms 37, 37, of said valve, Fig. 10. The valve is thus hung with its open upper end immediately below the space between the opposing faces of barrels 9 and 10, and in the vertical line through a coin receiving slot 34 in the top of the casing 1. A spring 35 operative on a plunger 36, Figs. 2 and 15, and seated in a recess of the stationary barrel 9, exerts its pressure against a projecting lug 42 of the valve so as to normally maintain said valve in position to direct a coin into the compartment 7, which is the one reserved for counterfeits, slugs, etc., that are rejected by the machine. The lug 42 is here shown as formed on one of a pair of upward extensions 40, 41 of the valve, which are slightly divergent to facilitate the reception of the coins. The side arms 37 have slots 38 therein, Fig. 10, to receive oppositely facing pins 39, 39, carried respectively by the levers 26 and 27, Figs. 2 and 15.

The mechanism so far as herein described is substantially the same as that shown and described in the aforesaid patent to Reith, wherein certain coin measuring instrumentalities, contained and embodied in the barrels 9 and 10, are employed to control the movements of the levers 26 and 27 and thereby to cause the shifting of the valve 6 from its normal position when a coin is revealed by said instrumentalities to be genuine and of the denomination contemplated by the adjustment of the machine. According to the present invention a wholly different set of coin measuring instrumentalities for controlling the movements of the levers 26 and 27 is contemplated, with the end in view of increasing the efficiency of the machine as a rejector of counterfeit coins and spurious imitations, no matter how closely they approach the genuine varieties. In common with the machine of the patent to Reith the machine of the present invention is constructed on the duplex principle, i. e., being so designed as to accept standard coins of the same denomination, but of two different sets of dimensions, such for instance as "buffalo" and "V" nickels. The coin measuring instrumentalities which are embodied and contained in the barrels 9 and 10 for this purpose will now be described in detail.

Figure 16:
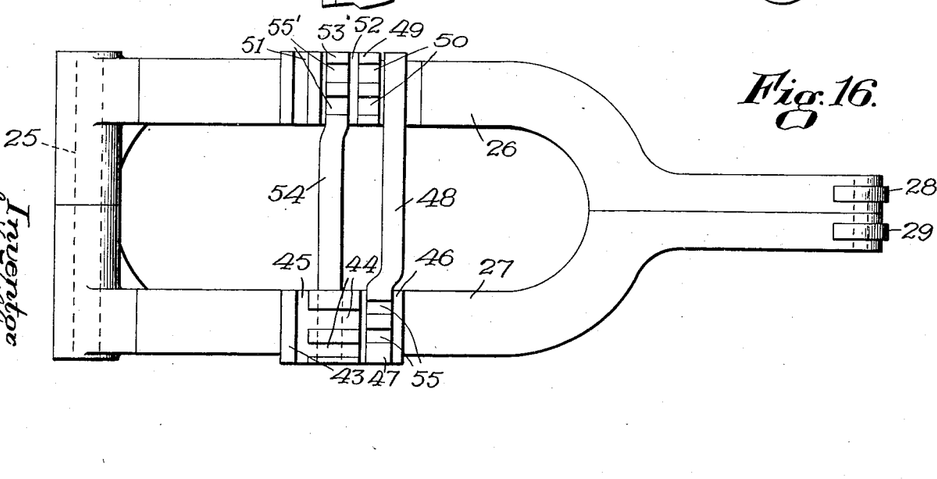
Figure 16 is a plan view of the operating levers shown in Fig. 9.
Figure 17:
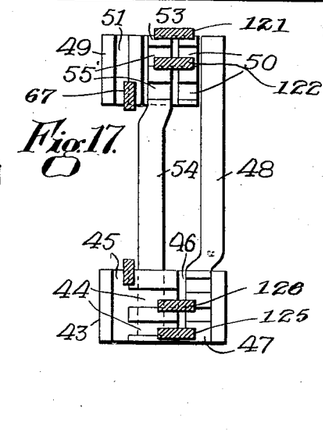
Figures 17, 18 and 19 are enlarged diagrammatic plan views illustrating the cooperation of the levers or pendulums with certain locking wards, projections and recesses.

As shown in Figs. 9 and 16 the lever 27 carries a ward block 43, having a plurality of longitudinally extending recesses 44 and a transverse recess 45, whereby to provide a series of projections or wards on the upper face of said lever. Immediately adjacent the forward ends of these wards is a transverse recess 46 which is adapted to receive a ward block 47 carried by a transversely extending arm 48 which is permanently connected to the other valve operating lever 26. This lever 26 carries a ward block 49 with longitudinal recesses 50 and a transverse recess 51, forming wards similar to those provided by the block 43 on the lever 27. The lever 26 also provides a recess 52 for the reception of a ward block 53 carried by the end of an arm 54 that is secured to the lever 27. The blocks 47 and 53 have grooves or recesses 55 and 55' respectively, therein, forming projections or wards similar to the wards of the blocks 43 and 49.

It will be noted from Figs. 16 to 19, inclusive, the grooves 55 are not exactly in line with the grooves 44, although the arm 48 and the recess 46 are so proportioned that when both the levers 26 and 27 have their respective rollers 28 and 29 engaging the concentric part of cam 15, there is a space or clearance between the under face of the block 47 and the bottom of the recess 46. This space is of such depth that the lever 27 may move upwardly about its pivot 25 without interference from the arm 48 of lever 26, and the cam 15 is so moved as to permit of such action under the influence of spring 31, and when certain other elements hereinafter described are in proper position.

Similarly, the grooves 55' are not exactly in line with the adjacent grooves 50, but there is a space or clearance between the block 53 and the bottom of the recess 52 of lever 26; this space is likewise of sufficient depth to permit the lever 26 to be moved upwardly about its pivot 25 without interference from the arm 54, in the same way that the lever 27 may be independently moved.

As shown in Fig. 12, the stationary barrel 9 is formed on its front face with a projecting portion 56 having parallel vertical sides which are extended back into the barrel to form slots 57 and 58 between said portion 56 and the plane surfaced parts of the end of the barrel on either side of said portion 56. The adjacent face of the movable barrel 10 has a central cylindrical projection 59, Figs. 2 and 11, on which is mounted, for longitudinal sliding movement, a vertically extending parallel sided block 60, whose upper and lower ends are formed on a circular curve of the same diameter as the barrel 10. The sides of the block 60 are provided with projecting flanges 61 which are adapted to embrace on either side the projecting portion 56 of barrel 9 and to extend into the slots 57 and 58 of said last mentioned barrel.

Figure 1:
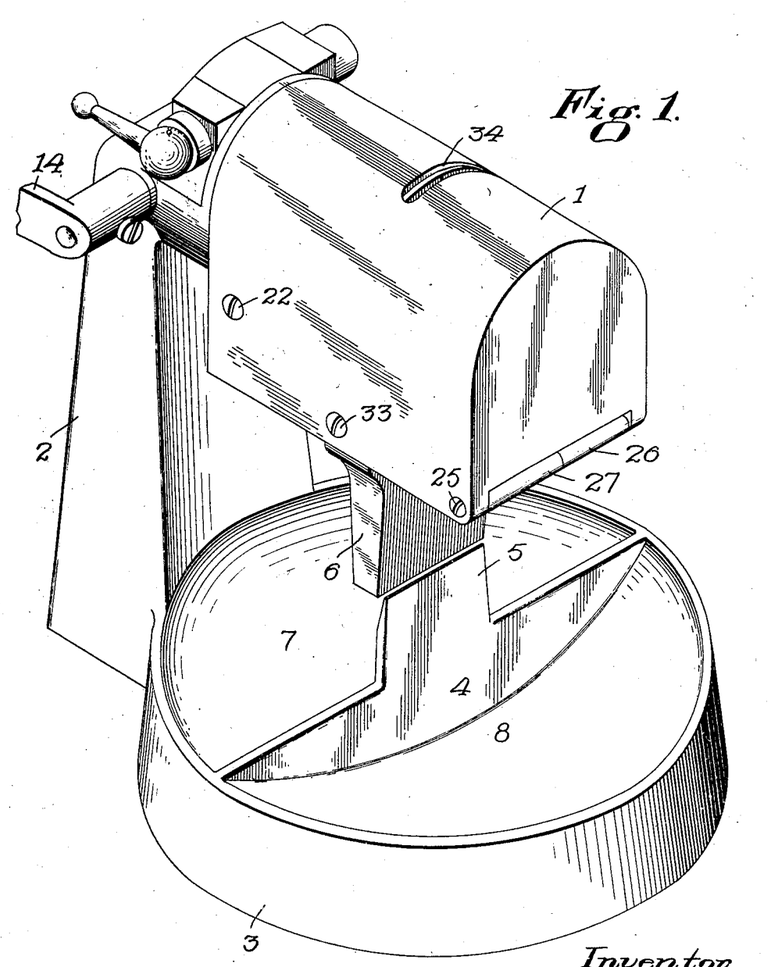
Figure 1 is a perspective view of a coin detector constructed according to my invention.
Figure 2:
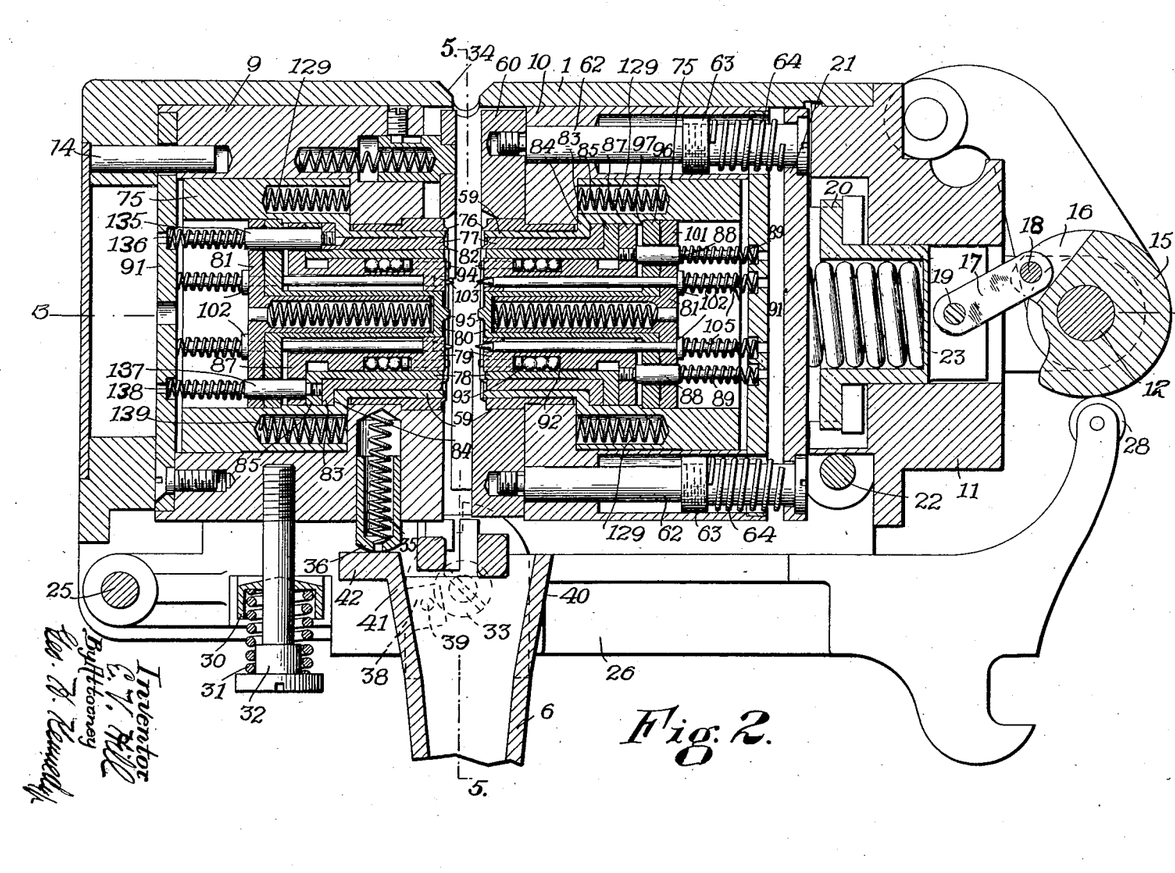
Figure 2 is an enlarged vertical section showing the detector mechanism, with the supporting structure of the detector omitted.
Figure 5:
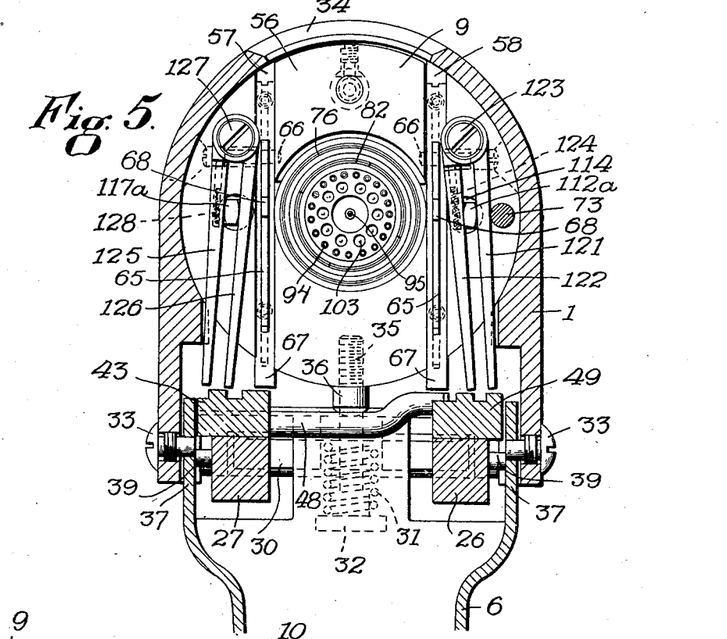
Figure 5 is a vertical section on the line 5—5, Fig. 2.
Figure 7:
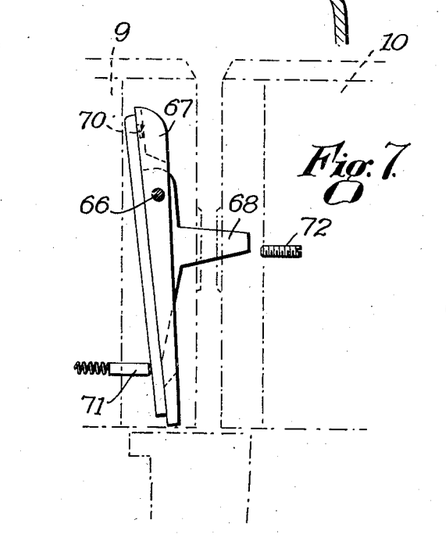
Figures 7 and 8 are a side elevation and a detached perspective view, respectively, illustrating a pair of lock controlling levers.
Figure 8:
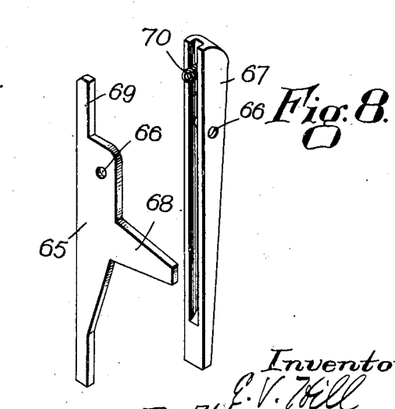

The block 60 is connected to the plate 21 by a pair of bolts 62, Fig. 2, each of which has its head countersunk in said plate 21 and has its opposite end fitted into said block 60. The bolts 62 pass loosely through the barrel 10, and intermediate their ends are provided with annular collars 63. Between said collars 63 and the plate 21 are disposed springs 64 operative normally to provide a yielding connection, through which the block 60 is moved by plate 21 in advance of the barrel 10. In each of the slots 57 and 58 of the stationary barrel 9 are pivotally mounted a set of compound pendulums of the construction shown in Figs. 7 and 8; each consists of a three arm lever 65, pivoted at 66 within its respective slot and a second lever 67, also pivoted at 66 whose lower end projects below the cylindrical surface of the barrel 9, as shown in Fig. 5. The lever 67 of each set is vertically slotted or bifurcated to permit of the passage between its sides of the horizontal arm 68 of the three arm lever 65. The upper end of each lever 67 which projects beyond the upper arm 69 of its corresponding three arm lever 65 carries a spring 70 which presses against said arm 69 and thereby yieldingly holds the lever 67 in fixed relation to the lever 65. Spring pressed plungers 71 operative in suitable cavities at the back of the recesses 57 and 58 of the stationary barrel 9 normally maintain each pair of levers 65, 67 in a position slightly inclined to the vertical, with the arms 68 raised slightly above the horizontal, so that when pressure is exerted against the flat ends of these arms 68, the levers 65 will move on their pivots 66 toward a vertical position, with the associated levers 67 following this movement under the action of the springs 70.

The application of pressure to the projecting arms 68 is effected through adjustable pins 72 carried by the rear face of the movable barrel 10, said pins 72 being arranged to engage the arms 68 when the barrel 10 is moved toward the barrel 9. As hereinafter described, the lower ends of the levers 67 are adapted to cooperate with the transverse wards of blocks 43 and 49 of the valve operating levers 26 and 27, in order to prevent the upward movement of levers 26 and 27 under the action of spring 31, except when said levers 67 occupy predetermined positions that bring their lower ends in line with the appropriate recesses 45 or 51 adjacent said wards.

As in the machine of the aforesaid patent to Reith, the barrel 10 carries a pin 73 which projects into a corresponding hole in the barrel 9, in order to provide a guide for the movement of said barrel 10. Also, as in the Reith patent, the stationary barrel 9 is rigidly held in the rear end of the casing 1 by means of a pin 74. As hereinafter described the two barrels 9 and 10 are substantially alike in their interior construction as regards the coin measuring instrumentalities of each, so that a description of one barrel in these respects will suffice for both, it being obvious that each of the several coin measuring instrumentalities or sets of mechanism is provided in duplicate, these sets opposing each other at the space between the barrels 9 and 10 within which the coin is received. As herein shown, each barrel 9, 10, consists of a relatively heavy cylindrical shell having two concentric cylindrical cavities for the reception of a plunger 75, with portions of large and small diameter, respectively, fitting said two cavities. Immediately surrounding the opposing ends of the plungers 75, the barrels are provided with coacting annular knife edges 76, 76, one inserted and held in the portion 56 of barrel 9 and the other inserted and held in the portion 59 of barrel 10. These knife edges 76, as hereinafter described, are utilized for the measurement of the thickness of a coin just within the periphery thereof, and this measurement is transmitted to the levers 67, 67, so as to cause the latter to assume positions over their respective ward blocks 43 and 47 which will allow either of the levers 26 or 27 to rise, if the measured coin is of the proper thickness. Each plunger 75 contains five concentric plunger mechanisms 77, 78, 79, 80 and 81, all of which are slidable and telescopically mounted, one within the other, in the order named.

Plunger 77 of each set of measuring instrumentalities is constituted by a plurality of adjacent sections or segments, here shown as four in number, and each provided with a measuring knife edge 82, the whole affording an annular four part knife edge of less diameter than the knife edge 76. At the outer end of each plunger 77 is formed an annular flange 83 against which bears a stud 135 under pressure from a spring 136, so as to normally hold the flange 83 in contact with a shoulder 84 on the plunger 75.

Each plunger 78 is provided with an annular flange 85 which is normally in contact with the segmental annular flange 83 of the associated plunger 77. Said flange 85 is provided with suitable clearance openings for the free passage of the studs 135, and said flange 85 is itself provided with a stud 86 for a purpose hereinafter set forth. Studs 137, similar to the studs 135, and under pressure from springs 138 bear against the flange 85 to normally hold it in contact with the flange 83.

The plunger mechanism 79 which is within the plunger 78 has an annular flange 87 which is normally held in contact with the flange 85 by means of studs 88 under the pressure of spring 89. This annular flange 87 provides clearance openings for the free passage of studs 86, 135, and 137, hereinbefore referred to, the respective springs of which all bear against a plate 91 which closes the outer end of the barrel 9 or 10, as the case may be.

The plunger 79 is formed midway of its length with an annular groove 92 affording space for a plurality of balls 93, 93, which space is closed on the outside by the surrounding flange 78. A plurality of concentrically arranged coin measuring pins 94 are slidably disposed in openings of the plunger 79 that lead from the space 92 to the face of said plunger, the inner ends of said pins 94 being in engagement with the balls 93 in said space, for a purpose hereinafter described.

The plunger 80 which carries a central measuring pin 95 is provided with an inular flange 96, one surface of which normally bears against a shoulder 97 of plunger 75. Said flange 96 is provided with suitable clearance openings for the free passage of studs or pins 88, 135 and 137, and in addition affords, adjacent the stud 86, a space or opening for the reception of three balls, 98, 99 and 100, the purpose of which will be hereinafter set forth in detail.

The plunger 81 is provided with a flange 101 similar to the flange 96, and this flange 101 has one surface normally in contact with the flange 96 and the other surface engaged by collars 102 on a plurality of coin measuring pins 103, said pins extending freely through suitable openings in flanges 96 and 101 and projecting through openings 104 on the face of plunger 79. The flange 101 affords suitable clearance openings for the free passage of pins or studs 88, 135 and 137, and also a hole or space for the ball 100 above referred to.

The collar 102 of the coin measuring pins 103 are engaged by springs 105, whose opposite ends take bearing in countersunk holes of plate 91. The springs 105 normally hold the collar 102 in contact with the flange 101, and through the flange 101 hold the flange 96 in contact with the shoulder 97. The interior of plunger 81 contains a compression spring 106, one end of which bears against said plunger, while the other bears against the inner face of plunger 80.

In the employment of the above described cooperating duplex sets of coin measuring instrumentalities, the knife edges 76, 82, pins 94, 103, and center points 95 are so placed as to make contact with definite chosen parts of the faces of a coin supported concentrically with said knife edges, and having is center coincident with the points 95. As in the machine of the Reith patent, a coin dropped through the slot 34 has its gravity movement arrested by means of a device which causes said coin to be positioned concentrically to the points 95, 95, and the several concentric knife edges and measuring pins. This positioning mechanism, in the present instance, comprises a longitudinally movable rod 107, Fig. 6, which is slidably mounted in the barrel 10 and block 11, with its front end enlarged, as shown at 108, and held by a spring 109 against a cam portion $15^a$ on shaft 12. While said cam portion $15^a$ is for the most part concentric with the shaft 12, it has a flat low portion 110 which allows the rod 107 to be retracted by spring 109 once in each rotation of the shaft. Normally the concentric portion of cam $15^a$ causes the rod 107 to be projected across the narrow vertical space between the barrels 9 and 10, and in this position the rod 107 will cause the coin dropped in the slot 34 to come to rest upon said rod and upon the wall provided by one of the flanges 61, so that the coin is held concentric with the center line of the two barrels 9 and 10 passing through their central pins or points 95, 95.

With the coin thus centrally disposed, the knife edges 76 and 82, the pins 94, 103, and the plunger points 95 contact with definite chosen concentric portions of both faces of said coin and are adapted to measure the relief thereof in the manner hereinafter described. This contact is effected by moving the barrel 10 toward the stationary barrel 9, so as to firmly grip and seize the coin between the corresponding knife edges and points that are carried by said barrels. Under these conditions which are brought about, as hereinafter described, by rotation of the shaft 12, the various measuring instrumentalities, including the knife edges 76, 82, the pins 94, 103, and the plunger points 95 are depressed a greater or less degree depending upon the relief of the coin at the particular point engaged by each, as will readily appear.

As a result of the depression of knife edges 82, the stud 86 carried by the flange 83 of plunger 77 is forced into contact with the ball 98. Similarly, as a result of the depression of pins 94 the flange 87 of plunger 79 is forced against the ball 99. Both balls 98 and 99 press against ball 100, which latter engages an adjusting screw 111 in the short arm of a bell crank lever 112 which is fulcrumed on a pin 113 carried by plunger 75, the lever 112 working in a slot formed in the side of said plunger.

The long arm of the lever 112 extends through an elongated cavity 114 of the barrel 10 and projects through a hole in the end thereof, being at all times pressed outwardly from said barrel by a spring 115. The projecting end of this longer arm of the lever 112 is rectangular in section, and its inner and outer faces are formed with a convex curvature, as shown in Fig. 5. The lever carried by stationary barrel 9 corresponding to the lever 112 of barrel 10, is indicated herein by the reference character $112^a$, said lever being in all respects the counterpart of the lever 112. The depression of plunger 81 is communicated by its flange 101 to an adjusting screw 116 carried by the short arm of a bell crank lever 117 which is fulcrumed on a pin 118. The pin 118 is carried by a bearing member 119, the latter being rigidly secured to and movable with the flange 96 of plunger 80. The longer arm of bell crank lever 117 extends through a slot in bearing member 119 and in barrel 10, being pressed outwardly from said barrel by a spring 120. The projecting end of this longer arm is rectangular in section, and its inner and outer faces are formed with a convex curvature, as shown in Fig. 5. The lever associated with barrel 9 and corresponding to the lever 117 is indicated, for convenience, by the reference character $117^a$, this lever being in all respects the same as the lever 117.

As shown in Figs. 5 and 12, the stationary barrel 9, in addition to the pendulum levers 65 and 67 carries on its face at either side a pair of oscillatory arms or pendulums, similar to those shown in the aforesaid patent to Reith. One such pair of pendulums 121, 122, are adapted to be operated by the ends of the levers 112 and $112^a$, which ends are received between said pendulums, as indicated in Fig. 3, with a line contact between the surfaces, owing to the convex curvature of the opposite sides of the lever arm. The pendulums 121 and 122 are both pivotally attached to the front face of the stationary barrel 9 by a pivot screw 123, and while said pendulums have a limited movement independently of each other, they are normally pressed yieldingly together in engagement with the levers 112 and $112^a$ by means of a spring 124 that acts between overlapping portions of their upper ends. Similarly a second pair of pendulums 125, and 126 are suspended from a pivot screw 127 on the other side of the face of barrel 9, so as to embrace the ends of the levers 117 and $117^a$, as shown in Fig. 3, the engagement being by a line contact, as above explained in connection with the levers 112, $112^a$, the two pendulums 125 and 126 are also movable independently, but at all times are yieldingly pressed toward each other in engagement with the levers 117 and $117^a$ by a spring 128 similar to the spring 124.

The four pendulums 121, 122, 125 and 126 are all of such length that their lower ends project below the line of the cylindrical exterior surface of the barrel 9. Said pendulums terminate at or immediately adjacent the horizontal plane through the lower ends of the pendulums or levers 67, being so placed that the first mentioned pair, 121, 122, cooperate with the main wards of block 49 on lever 26, and also the bridging wards on the block 53 of arm 54. On the other hand the second mentioned pair of pendulums 125, 126 cooperate with the main wards of block 43 on lever 27, and also with the bridging wards on the block 47 at the end of arm 48.

When a coin has been dropped into slot 34, and has been arrested by rod 107 in position to be calipered, as above described, it will be obvious that the valve 6 is held by the two levers 26 and 27 and by the spring 35 in such a position as to direct a coin falling through it into compartment 7, reserved for spurious or counterfeit pieces. Under these conditions the levers 26 and 27 are prevented from moving under the action of spring 31 either because their rollers 26 and 28 are in engagement with the concentric part of cam 15 or because the ends of one or more of the six pendulums 67, 67, 121, 122, 125 and 126 are opposite and in contact with the wards or projections carried by said levers.

Upon the rotation of the shaft 12 through slightly more than a quarter of a revolution the barrel 10 begins to move toward the barrel 9, it being noted that the movement of said shaft is transmitted through the link 17 to the sleeve 20, spring 23 and plate 21, which latter first acts through the springs 64 to move the block 60 toward the barrel 9 and thereafter acts to bodily move the barrel 10 in the same direction. This primary movement of the block 60 causes it to receive within its central cavity the coin which has been arrested by the rod 107. The subsequent movement of the barrel 10 with its knife edges, pins, and other measuring instrumentalities into engagement with the coin occurs while the shaft 12 is so moving that the pivot pin 18 is approaching the horizontal line that connects the center of the shaft 12 with the pin 19, and this occurs during the first half of the forward movement of the crank handle 14. As said movement is continued through its last half, the link 17 operates to retract the barrel 10, and the cam portion 15ª is so disposed that during this last half of the rotation the flat portion of said cam, Fig. 6, allows the retraction of rod 107, thus permitting the coin to drop into the valve 6.

As the barrel 10 begins its movement toward the barrel 9 by force applied through the plate 21, the knife edges 76 are brought into engagement with the outer part of the coin just inside of its rim or flange, thus firmly gripping and holding the coin within the cylindrical cavity of the block 60. These knife edges 76 operate in precisely the same manner as the corresponding knife edges in the machine of the Reith patent to caliper the thickness of the coin adjacent its periphery; the gripping of said coin by said knife edges interrupts the movement of the barrel 10, and consequently determines the degree of movement which is imparted to the arms 68 of levers 65 by the pins 72 which are carried by said movable barrel 10. As in the Reith patent, the pins 72 strike the arms 68 of the two levers 65, thus turning said levers on their pivots and likewise causing the two levers 67 to swing toward a vertical position. If the coin is of standard thickness near its periphery, one of the levers 67, depending in the present instance upon whether the coin is a "buffalo" nickel or a "V" nickel, will have its lower end disposed immediately above the recess 45 or the recess 51, as the case may be, and will thus permit either one of the levers 26 or 27 to rise under the action of spring 31,—provided of course the corresponding pair of pendulums 121, 122 or 125, 126, will permit of this movement. These pairs of pendulums are controlled by the other coin measuring instrumentalities of the barrels 9 and 10, the action of which will now be described in detail.

The sectional knife edges 82 of the four part plunger 77 are pressed inward against the opposite faces of the coin for variable distances, depending upon the relief of the coin at the different parts of the circle engaged by said knife edges. In other words, the four plunger portions 77 will occupy different relative longitudinal positions when their respective knife edges are in contact with the face of the coin; one of these plungers will obviously take up a position determined by the minimum relief of the coin on the circle engaged, and another will take up a position determined by the maximum relief of the coin on the circle engaged. The plunger portion 77 which is farthest held outwardly by the maximum relief of the coin acts through its flange 83, bearing on flange 85, to force the stud 86 outwardly. The movement of the stud 86 is transmitted through balls 98, 99 and 100 to the contact screw 111 of lever 112, thereby moving said lever 112, and also obviously the lever 112ª about the pivot 113, so as to control either the pendulum 121 or 122, as the case may be.

On the other hand that plunger portion 77 which is least moved outwardly, as determined by the minimum relief of the coin, assumes a position which permits the movement of plunger 75, under the action of springs 129, thereby tending to keep the shoulder 84 in contact with flange 83. This outward movement of plunger 75 changes the position of pivot point 113. Obviously, such a change in the pivot points of the levers 112 and 112ª results in a variation of the movement of the long arms of said levers that would otherwise not occur, and consequently the control of the pendulums 121, 122, is affected accordingly. From the above it will be clear that the knife edges 82 exercise a dual control over the pendulums 121 and 122; the maximum relief of the coin on the measuring circle of said knife edges controls said pendulums by rocking the levers 112, 112ª about their pivot points 113; and the minimum relief of the coin on the same measuring circle controls said pendulums by coincidently shifting said pivots 113.

In respect to the plunger 79, the steel balls 93 do not completely fill the space 92 in said plunger, and consequently when the coin contacts with the circular series of pins 94, said pins are variously moved, some forwardly, and some rearwardly, in accordance with the varying relief of the coin on the particular measuring circle engaged by said pins. The relation of the pins 94 and balls 93 to the rear wall of the containing space 92 is such that when all of said pins are in contact with the coin and have come to fixed positions relatively to each other, the inward movement of barrel 10 results in causing said balls and pins to press the plunger 79 outwardly, against the force of springs 89. Such movement is transmitted through flange 87 to ball 99, which in turn acts through balls 98 and 100 against the contact screw 111 of lever 112, to shift said lever, and obviously the lever 112ª about pivot 113.

The measurement of coin relief by the pins 94 and balls 93 is in effect the measurement of accumulative relief on that particular measuring circle of the coin which is engaged by said pins, since the amount of movement of plunger 79 is controlled by the degree to which the space 92 is filled, when the pins 94 are all in contact with the face of the coin. Obviously, if the coin relief is incorrect on this measuring circle, there will occur, by the movement of barrel 10, a further shifting of the balls 93 and pins 94 before the plunger 79 responds to the movement of barrel 10. This will in turn affect the movement of levers 112 and 112ª, with the result that the pendulums 121 and 122 will not assume the same positions that they would assume if the relief of the coin were correct; there is thus a triple control of said pendulums.

On the next smallest measuring circle, the gage pins 103 are moved outwardly by the coin against the pressure of springs 105. That gage pin 103 which moves the least will determine the distance that the flange 101 is permitted to move outwardly, due to the engagement of said flange with the collar 102 of said pin. Such outward movement of flange 101 is transmitted to contact screw 116 of lever 117, thereby shifting said lever, and obviously the lever 117ª about the pivots 118, and thus controlling the operation of one or the other of pendulums 125, 126, as the case may be. It will thus be noted that the minimum relief of the coin, on the measuring circle of said gage pins 103, results in a control of pendulums 125 and 126.

At the innermost point of contact with the coin, namely, the point 95, the plunger 80 is pressed outwardly, such motion being transmitted through the flange 96 to shift the bearing 119 carried thereby, thus changing the position of the pivot point 118 of lever 117, and obviously of lever 117ª. This imposes an additional control on the movements of pendulums 125 and 126 in the manner similar to that previously described in connection with the dual control exercised on the pendulums 121 and 122 by the levers 112 and 112ª. In other words, one measuring instrumentality, namely, the gage pins 103, is utilized to measure the minimum relief of the coin on a given measuring circle, and the effect of this minimum relief is transmitted to rock the levers 117 and 117ª on their pivots 118. Simultaneously, another measuring instrumentality, namely, the points 95 are availed of to measure the relief of the coin at its center, and the effect of this measurement is transmitted to shift the pivot points 118 of said levers 117, 117ª. In this way a dual control of the pendulums 125 and 126 is obtained.

Figure 20:
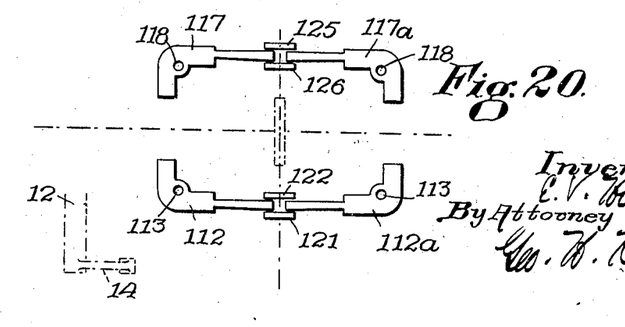
Figure 20 is a diagrammatic plan view showing the relation of the pendulums to their operating levers.

In the present embodiment of the invention the proportions and adjustments of the parts are such that if a "buffalo" nickel is presented to the slot 34 with its head facing the shaft 12 so that the measuring instrumentalities of barrel 10 will contact with said head side, the control of the pendulums 121, 122, 125 and 126 will be as follows, see Fig. 20: The lever 117 will control the pendulum 126, the lever 117ª will control the pendulum 125, and the lever 112 will control the pendulum 122, and the lever 112ª will control the pendulum 121.

If the coin is genuine, the grooves in the several ward blocks will then occupy such a relation to the ends of these pendulums that the lever 27 will be allowed to move upwardly when the low part of cam 15 is opposite the roller 29, provided of course that the thickness pendulum 67 associated with said lever has been moved to the proper position under the influence of the knife edges 76, as hereinbefore described.

If, on the other hand, said buffalo nickel be tested with its tail side facing front, so that the measuring instrumentalities of barrel 9 contact with the head, then the control of the pendulums 121, 122, 125 and 126 is as follows, see Fig. 20: The lever 117ª controls the pendulum 126, the lever 117 controls the pendulum 125, the lever 112ª controls the pendulum 122, and the lever 112 controls the pendulum 121. Since the barrels 9 and 10 with their attendant measuring instrumentalities are identical in construction, proportion and adjustment, it is evident that the several pendulums will stand in identically the same relation to the recesses between the wards, irrespective of whether the heads or the tails of the coin face the barrel 9 or the barrel 10, and consequently the lever 27 will be rendered free to operate in either case, if the relief of the coin is correct.

Figure 18:
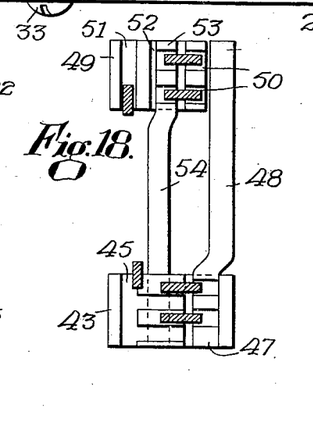
Figure 19:
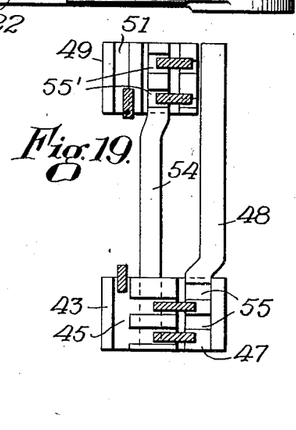

The precisely similar method of operation takes place when a "V" nickel is presented, the essential difference being that the grooves in the ward blocks are so related to the various pendulums, see Fig. 18, that the lever 26 is made active instead of the lever 27. In other words, lever 27 is active for a "buffalo" nickel, and lever 26 for a "V" nickel, irrespective of which way either nickel be presented to the machine. Said levers 26 and 27 are each operable independently on the coin directing valve 6 to cause movement of the latter when the coin responds to the several tests above specified, and it is to be noted that the upward operating movement of each lever 26 or 27 is made possible by reason of the clearance between the blocks 47 and 53 and the respective recesses 46 and 52, substantially as described in the aforesaid patent to Reith.

Furthermore, it is to be noted that in the operation of the lever 27, as above described, for a "buffalo" nickel, the pendulums 125, 126, are so disposed as to enter the slots 44 of ward block 43, but on the other hand, to make contact with the wards or projections between the slots 55 of the block 47. This allows the lever 27 to rise, but at the same time prevents any elevation of the lever 26, since the ward block 47 is integrally attached to the lever 26 by the bar 48. For this movement of the lever 27, the pendulums 121, 122, must be so disposed as to register with the slots 55' of block 53, but to engage the projections between the slots 50 of block 49. This locking of the lever 26 is made possible by the fact, that as before stated, the slots or grooves 44 and 55 are not in exact alinement nor are the slots or grooves 50 and 55'. In the same way, the lever 27 is locked against movement when the lever 26 is permitted to rise, as when a "V" nickel is presented to the machine.

It will thus be seen that in a duplex type of selector, of the type disclosed in the aforesaid patent to Reith, there is provided by the present invention a highly efficient combination and arrangement of coin calipering and measuring devices, which are adapted to practically assure the rejection of all spurious and counterfeit coins or slugs presented to the machine. Such results are primarily obtained by the adoption of wholly new principles in the measurement of coin relief, among which a highly important one is the above described measurement of accumulative relief on the measuring circle engaged by the pins 94.

In addition, as a novel feature contributing greatly to the more accurate and efficient operation of the selector, the pivotal points of the pendulum controlling levers 112, 112ª, and 117, 117ª are movable independently of each other, rather than jointly, as in the machine of the aforesaid Reith patent; this, as will be obvious, greatly increases the sensitiveness of the machine, and renders the pendulums 121, 122, and 125, 126, more delicately responsive to variations in the relief of the coin being measured.

According to the present invention, as distinguished from devices of this class heretofore known, there is obtained, in addition to the advantageous results pointed out above, a dual control of the pendulums from a single measuring circle, namely, the circle determined by the segmental knife edges 82. Under this arrangement, the maximum relief of the coin on this circle is a measure of the movement of levers 112, 112ª about their pivots, while simultaneously, the minimum relief of the coin on this same circle is a measure of the shifting movement of the pivots of said levers.

The combination of the foregoing novel instrumentalities, with each other, and with the various other coin measuring and calipering instrumentalities of the machine, result in such a sensitive control over the movements of the several pendulums that the passage of a counterfeit or spurious piece into the compartment 8 of the machine is rendered practically impossible. The pendulums 121 and 122 are made responsive not only to the maximum and the minimum relief of the coin, as measured on the circle determined by the segmental knife edges 82, but also to the accumulative relief of the coin, as measured on the circle determined by the pins 94; the slightest variation from the predetermined standard in any one of these measurements results in a rejection of the coin.

Similarly the pendulums 125 and 126 are made responsive not only to the minimum relief of the coin as measured on the circle determined by the gaging pins 103, but also to the relief at the center of the coin, as measured by the points 95; any variation in either of these measurements from the predetermined standard results in a rejection of the coin for the reasons pointed out above.

Furthermore, owing to the interaction existing between the two levers 26 and 27, as illustrated in Figs. 9 and 16, each one of the six pendulums 67, 67, 121, 122, 125, and 126, must occupy a predetermined position, with respect to the wards of blocks 43, 47, 49 and 53 before the passage of a coin into compartment 8 is permitted, and it is impossible for these positions to be assumed, unless the coin being measured fulfills each and every one of the requirements demanded by all of the several measuring instrumentalities.

I claim,

1. In a coin selector, the combination with calipering members adapted to engage the two faces of a coin, for measuring the accumulative relief of groups of points at selected locations on said faces, and means responsive to the movement of said members for procuring the acceptance or rejection of said coin.

2. In a coin selector, the combination with coin-directing means, of means for controlling said coin directing means, and means responsive to the accumulative relief of a group of selected points on a circle of predetermined radius on the face of a coin for determining the action of said controlling means.

3. In a coin selector, two sets of devices for simultaneously measuring the accumulative relief of groups of concentrically arranged points on both faces of a coin, and a coin directing device actuated to accept said coin only when both of said sets of devices are actuated by a predetermined standard coin.

4. In a coin selector, two sets of devices for simultaneously measuring the accumulative relief of groups of concentrically arranged points on both faces of a coin, two sets of pressure actuated mechanisms governed by each set of measuring devices, and a coin directing member controlled by said sets of mechanism to cause the acceptance of two coins of the same denomination but of different design, while rejecting all other coins.

5. In a coin selector, a member movable toward the face of a coin, a plurality of devices slidably carried by said member for engagement with a selected group of points on said coin, a plurality of balls disposed between said member and said devices for limiting the accumulative movement of said devices relatively to said member, whereby an unyielding relation between said coin and said member is ultimately established in the movement of said member toward said coin, and means responsive to the movement of said member to establish said relation, for controlling the acceptance or rejection of said coin.

6. In a coin selector, a member movable toward the face of a coin, a plurality of devices slidably carried by said member for engagement with a selected group of points on said coin, a plurality of balls disposed between said member and said devices in limited yielding contact with said devices, whereby an unyielding relation between said coin and said member is ultimately established in the movement of said member toward said coin, and means responsive to the movement of said member in establishing said relation for controlling the acceptance or rejection of said coin.

7. In a coin selector, a plurality of calipering devices operative on the face of a coin, and a pair of pivoted members each responsive to certain of said devices for controlling the acceptance or rejection of said coin, the pivots of said members being shiftable independently.

8. In a coin selector, a plurality of calipering devices operative on the face of a coin, a pair of pivoted members, each movable on its pivot, in response to certain of said devices for controlling the acceptance or rejection of said coin, and means responsive to said calipering devices for shifting the pivots of said members independently.

9. In a coin selector, two sets of devices for simultaneously calipering the opposite faces of a coin, a pair of pivoted members governed by each set of calipering devices, and means responsive to said calipering devices for independently shifting the pivots of each pair of members.

10. In a coin selector, the combination with means for controlling the acceptance or rejection of a coin, of means for determining the action of said controlling means in accordance with the simultaneous measurement of both the minimum relief and the maximum relief of a group of points on the same side of said coin.

11. In a coin selector, the combination with means for controlling the acceptance or rejection of a coin, of means for determining the action of said controlling means in accordance with the simultaneous measurement of both the minimum relief and the maximum relief of a group of points in a selected locality on the same side of said coin.

12. In a coin selector, the combination with means for controlling the acceptance or rejection of a coin, of means for determining the action of said controlling means in accordance with the simultaneous measurement of both the minimum relief and the maximum relief of the coin around a circle of predetermined radius on one side of the coin.

13. In a coin selector, a pivoted member operative to control the acceptance or rejection of a coin, and means for determining the movement of said member in accordance with the simultaneous measurement of both the maximum and the minimum relief of a coin on a circle of predetermined radius, the effects of such measurements being transmitted separately to said member.

14. In a coin selector, a pivoted member operative to control the acceptance or rejection of a coin, and means for determining the movement of said member in accordance with the simultaneous measurement of both the maximum and the minimum relief of a group of points in a selected locality on said coin, the effect of the maximum measurement being transmitted to said member independently of the effect of the minimum measurement.

15. In a coin selector, a pivoted member operative to control the acceptance or rejection of a coin, means for moving said member on its pivot, and means for simultaneously shifting said pivot, the action of both of said last mentioned means being determined in accordance with the maximum and minimum relief of the coin on a circle of predetermined radius.

16. In a coin selector, a pivoted member operative to control the acceptance or rejection of a coin, means for moving said member on its pivot, in accordance with the maximum relief of a coin on a circle of predetermined radius, and means for simultaneously shifting said pivot in accordance with the minimum relief of the coin on the same circle.

17. In a coin selector, a pivoted member operative to control the acceptance or rejection of a coin, means for moving said member on its pivot, in accordance with the maximum relief of a coin on a circle of predetermined radius, and means for moving said member on its pivot in accordance with the accumulative relief of a group of points on said coin.

18. In a coin selector, a pivoted member operative to control the acceptance or rejection of a coin, means for moving said member on its pivot, in accordance with the maximum relief of a group of points on a coin, and means for moving said member on its pivot in accordance with the accumulative relief of another group of points on said coin.

19. In a coin selector, a pivoted member operative to control the acceptance or rejection of a coin, means for moving said member on its pivot, in accordance with the maximum relief of a coin on a circle of predetermined radius, means for moving said member on its pivot in accordance with the accumulative relief of a group of points on said coin, and means for simultaneously shifting said pivot in accordance with the minimum relief of said coin on said circle of predetermined radius.

20. In a coin selector, a pivoted member operative to control the acceptance or rejection of a coin, means for moving said member on its pivot, in accordance with the maximum relief of a group of points on a coin, means for moving said member on its pivot in accordance with the accumulative relief of another group of points on said coin, and means for simultaneously shifting said pivot in accordance with the minimum relief of one of said groups of points.

21. In a coin selector, a pivoted member operative to control the acceptance or rejection of a coin, means for moving said member on its pivot, in accordance with the maximum relief of a group of points on a coin, means for moving said member on its pivot in accordance with the accumulative relief of another group of points on said coin, and means for simultaneously shifting said pivot in accordance with the minimum relief of said first mentioned group of points.

22. In a coin selector, the combination with means for controlling the acceptance or rejection of a coin, of means for determining the action of said controlling means in accordance with the accumulative relief of one group of concentrically arranged points on a coin, and means for determining the action of said controlling means in accordance with the relief of another point on said coin.

23. In a coin selector, the combination with means for controlling the acceptance or rejection of a coin, of means for determining the action of said controlling means in accordance with the accumulative relief of one group of concentrically arranged points on a coin, and means for determining the action of said controlling means in accordance with the minimum relief of another group of points on said coin.

24. In a coin selector, the combination with means for controlling the acceptance or rejection of a coin, of means for determining the action of said controlling means in accordance with the accumulative relief of one group of concentrically arranged points on a coin, and means for determining the action of said controlling means in accordance with both the maximum and the minimum reliefs of another group of points on said coin.

25. In a coin selector, the combination with means for controlling the acceptance or rejection of a coin, of means for determining the action of said controlling means in accordance with the accumulative relief of one group of concentrically arranged points on a coin, means for determining the action of said controlling means in accordance with the relief of another point on said coin, and means for determining the action of said controlling means in accordance with the minimum relief of a third group of points on said coin.

26. In a coin selector, the combination with means for controlling the acceptance or rejection of a coin, of means for determining the action of said controlling means in accordance with the accumulative relief of one group of concentrically arranged points on a coin, means for determining the action of said controlling means in accordance with both the maximum and the minimum reliefs of another group of points on said coin, and means for determining the action of said controlling means in accordance with the minimum relief of a third group of points on said coin.

27. In a coin selector, the combination with means for controlling the acceptance or rejection of a coin, of means for determining the action of said controlling means in accordance with both the minimum and the maximum relief of one group of points on the same side of a coin, and means for determining the action of said controlling means in accordance with the minimum relief of another group of points on said coin.

28. In a coin selector, the combination with means for controlling the acceptance or rejection of a coin, of means for determining the action of said controlling means in accordance with both the minimum and the maximum relief of one group of points on the same side of a coin, and means for determining the action of said controlling means in accordance with the relief of another point on said coin.

Dated this 2nd day of November, 1918.

ERNST V. HILL.

Witnesses:
   PENELOPE COMBERBACH,
   NELLIE WHALEN.